United States Patent
Burns et al.

(10) Patent No.: US 8,086,075 B2
(45) Date of Patent: Dec. 27, 2011

(54) MOTION ADAPTIVE IMAGE PROCESSING

(75) Inventors: James Edward Burns, Basingstoke (GB); Karl James Sharman, Eastleigh (GB); Nicholas Ian Saunders, Basingstoke (GB); Robert Mark Stefan Porter, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 1057 days.

(21) Appl. No.: 11/949,267

(22) Filed: Dec. 3, 2007

(65) Prior Publication Data
US 2008/0152259 A1    Jun. 26, 2008

(30) Foreign Application Priority Data
Dec. 6, 2006  (GB) ................... 0624414.9

(51) Int. Cl.
*G06K 9/32*    (2006.01)
*H04N 11/06*    (2006.01)

(52) U.S. Cl. .............................. 382/300; 348/448

(58) Field of Classification Search .......... 382/262–264, 382/266, 284, 298–300; 348/448, 451, 452, 348/699–701, 910, 620
See application file for complete search history.

(56) References Cited

U.S. PATENT DOCUMENTS

| | | | | |
|---|---|---|---|---|
| 7,193,655 B2* | 3/2007 | Nicolas | ......................... | 348/448 |
| 7,265,791 B2* | 9/2007 | Song et al. | ................... | 348/448 |
| 7,321,396 B2* | 1/2008 | Jung et al. | ..................... | 348/452 |
| 7,525,599 B2* | 4/2009 | MacInnis et al. | ............. | 348/448 |
| 7,532,254 B1* | 5/2009 | Woodall | ....................... | 348/609 |
| 7,535,512 B2* | 5/2009 | Chao | ............................. | 348/448 |
| 7,542,095 B2* | 6/2009 | Zhou et al. | ................... | 348/452 |
| 7,742,110 B1* | 6/2010 | Woodall | ....................... | 348/665 |
| 7,791,672 B2* | 9/2010 | Kim et al. | ..................... | 348/448 |
| 7,864,246 B2* | 1/2011 | MacInnis | ..................... | 348/448 |
| 2004/0070686 A1* | 4/2004 | Jung et al. | ..................... | 348/448 |
| 2004/0190624 A1 | 9/2004 | Kondo et al. | | |
| 2004/0207753 A1 | 10/2004 | Jung | | |

FOREIGN PATENT DOCUMENTS
JP    2003-224854    8/2003
* cited by examiner

*Primary Examiner* — Gregory M Desire
*Assistant Examiner* — Andrae S Allison
(74) *Attorney, Agent, or Firm* — Oblon, Spivak, McClelland, Maier & Neustadt, L.L.P.

(57) ABSTRACT

An image processing method for image conversion by combining two or more source values based on a mixing parameter to generate an output pixel value. A metric is calculated for a selected pixel at a given image field based on the directly preceding image field and a spatially interpolated version of the given image field at the selected pixel position. The selected pixel is categorized based on the metric as providing an indeterminate, unreliable, or reliable basis for a determination of motion at that pixel. The mixing parameter for the selected pixel is adjusted based on the categorization of the pixel.

21 Claims, 13 Drawing Sheets

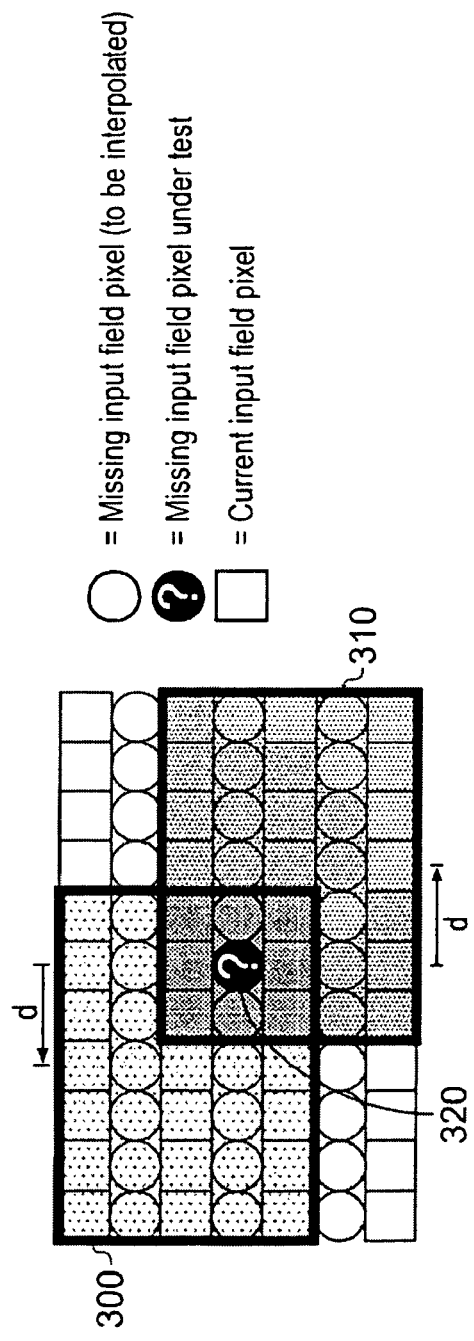
Fig. 5
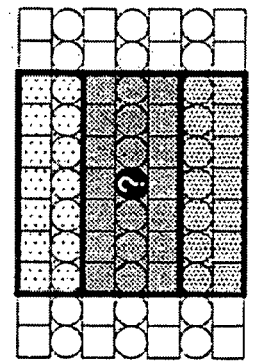
Fig. 6C
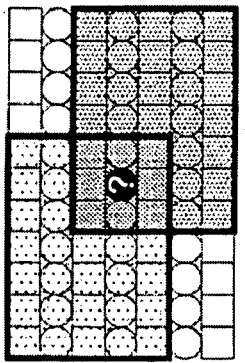
Fig. 6E
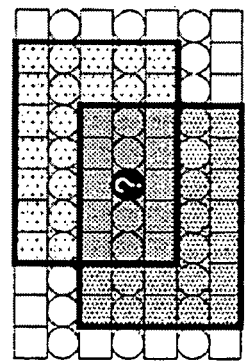
Fig. 6B
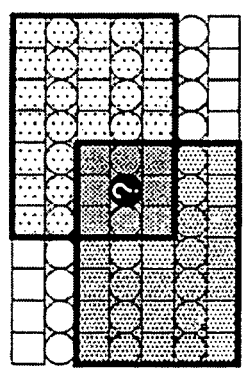
Fig. 6D
Fig. 6A

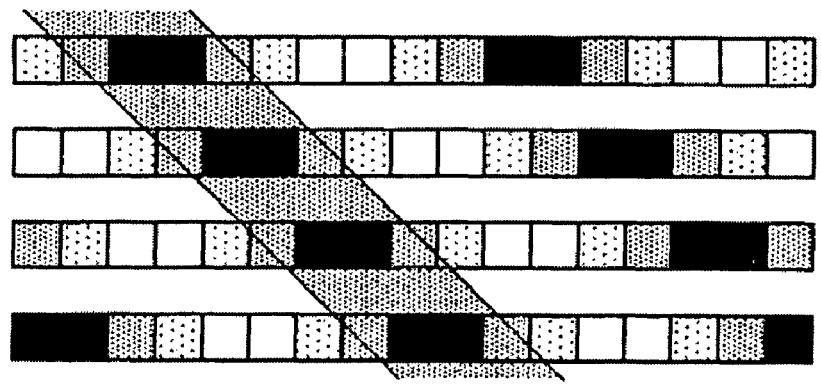
Fig. 8A
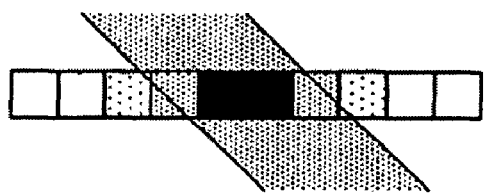
Fig. 8B
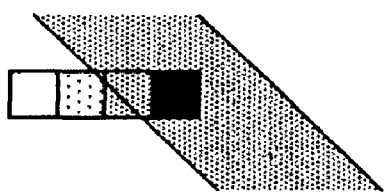 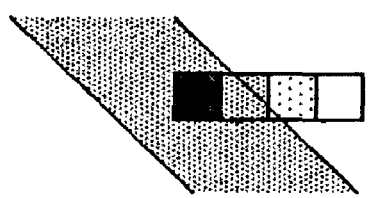
Fig. 8C  Fig. 8D

MOTION ADAPTIVE IMAGE PROCESSING

BACKGROUND OF THE INVENTION

1. Field of the Invention

This invention relates to motion adaptive image processing.

2. Description of the Prior Art

Video image capture represents a spatial and temporal sampling process. An image is captured as a set of pixels arranged in rows or lines. Successive images are captured at spaced instants in time.

A complication is the common use of interlaced video capture and processing. In an interlaced video signal, each image is handled as two sets or fields of alternate lines of pixels. For example, odd numbered lines might be included in one field, whereas even numbered lines could be included in the next field. An advantage of interlaced techniques is that they give an apparent doubling of the image rate, so reducing flicker effects, for no substantial increase in video signal bandwidth.

All of these aspects of sampling can give rise to alias effects if an attempt is made to capture or process video material having spatial or temporal frequencies which are too high for the respective sampling rate. But a particular alias problem will be described here in the area of interlace to progressive scan video conversion.

If it is desired to convert between interlaced video and progressive scan (non-interlaced) video, then for non-moving images it is merely necessary to interleave two successive fields to recreate a non-interlaced frame having all lines of pixels present. However, if there is any significant inter-field motion, this approach may not work. In such circumstances it can be more appropriate to derive the lines of pixels which are missing in one field from other pixels in that same field. In other words an intra-field interpolation process is used.

In practice, a video source may comprise image sequences in which some regions represent moving images whilst some regions do not. For example, when a newscaster speaks to a fixed camera, the newscaster's mouth, face, and head may move considerably, whilst their torso, the desk and the wall behind them do not.

Therefore the different conversion strategies noted above may be appropriate within different regions of the same image. It is therefore important to determine which strategy to use for a given pixel.

Interpolation will generally give a worse result than interleaving for non-moving portions, whereas interleaving and will generally give a worse result than interpolation for moving portions. So, the choice of the more appropriate technique is very important.

Notably however, the presence of noise in a video signal can give the appearance of motion in an otherwise static part of an image or conversely counteract motion and give the appearance of being static in an otherwise moving part of an image. Consequently in determining which conversion strategy to use for given pixel, it is important to determine the reliability of the motion information being provided by any analysis of the pixels.

An object of the invention is to mitigate or alleviate the above problem of determining reliability.

SUMMARY OF THE INVENTION

In one aspect of the present invention, a method of image processing for image conversion comprises the steps of; calculating a first metric for a selected pixel position in a current image field, the first metric being the difference between a directly preceding image field and a spatially interpolated version of the current image field at the selected pixel position; categorising, on the basis of the first metric, whether the selected pixel in the current image field provides either an indeterminate, unreliable or reliable basis for the determination of apparent motion at that selected pixel position in the current image field; and adjusting a parameter associated with the selected pixel depending upon the categorisation made.

In another aspect of the present invention, an image processing apparatus for image conversion comprises calculating means operable to calculate a first metric for a selected pixel position in a current image field, the first metric being the difference between a directly preceding image field and a spatially interpolated version of the current image field at the selected pixel position, categorising means operable to categorise, on the basis of the first metric, whether the selected pixel in the current image field provides either an indeterminate, unreliable or reliable basis for the determination of apparent motion at that selected pixel position in the current image field, and adjustment means operable to adjust a parameter associated with the selected pixel depending upon the categorisation made.

Advantageously, both of these aspects therefore provide the facility to modify a property of a pixel depending upon whether there is reliable basis to do so.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 5 and 6a to 6e schematically illustrate a spatial block matching operation;

FIGS. 8a to 8d schematically illustrate alias detection techniques;

DESCRIPTION OF THE PREFERRED EMBODIMENTS

Figure 1:
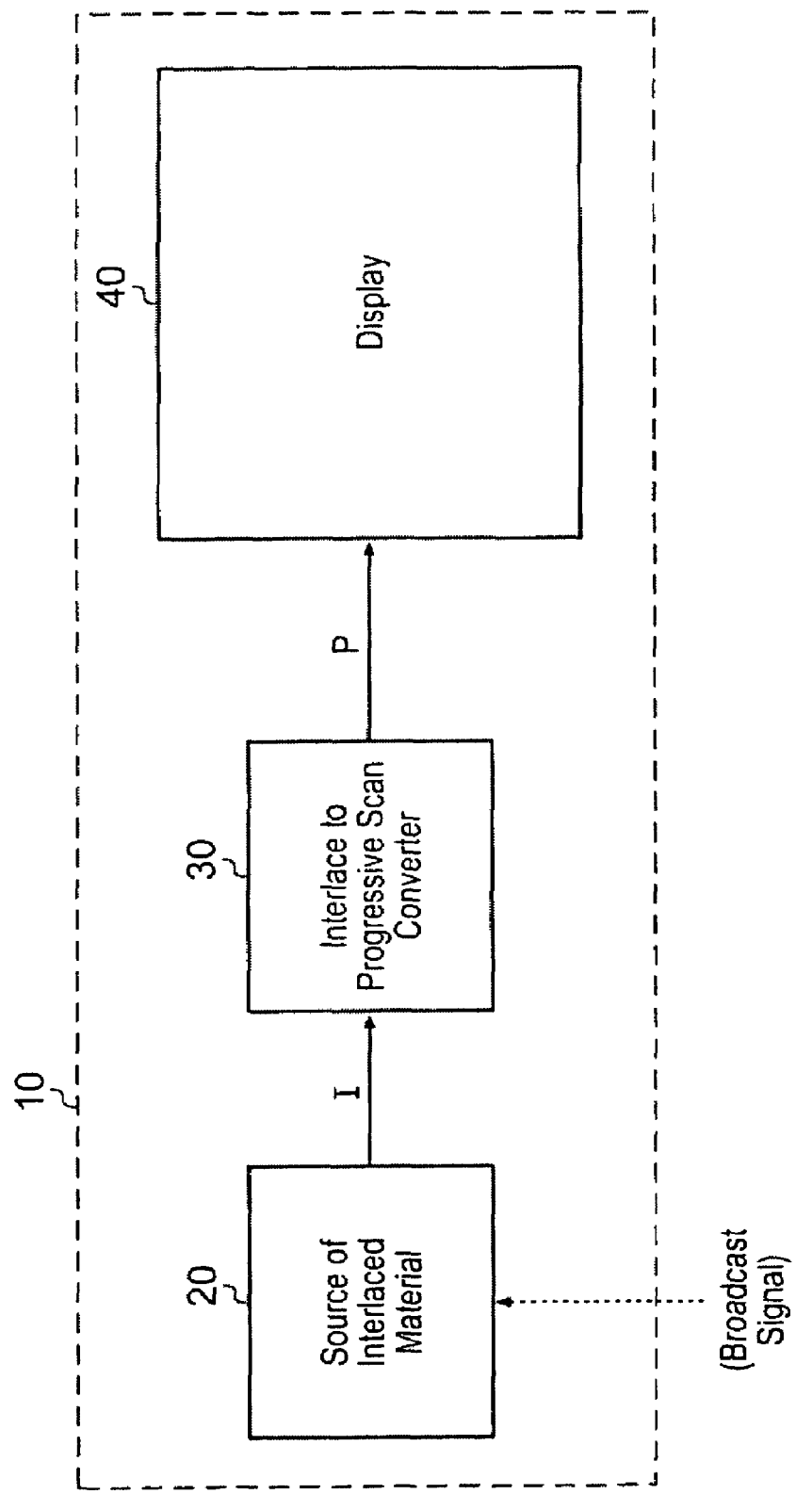
FIG. 1 schematically illustrates a flat-screen display arrangement.

FIG. 1 schematically illustrates a flat screen display arrangement 10 comprising a source of interlaced video material 20, an interlace to progressive scan converter 30 and a display panel 40 such as a liquid crystal (LCD) or plasma display. This illustrates a typical use of interlace to progressive scan conversion, in that many broadcast signals are in the interlaced format whereas many flat panel displays operate most successfully in a progressive scan format. Accordingly, in FIG. 1, a broadcast signal received by the source of interlaced material 20 is used to generate an interlaced signal for display. This is passed to the interlace to progressive scan converter 30 to generate a progressive scan signal from the interlaced signal. It is the progressive scan signal which is passed to the display 40.

It will be appreciated that the source of interlaced material 20 need not be a broadcast receiver, but could be a video replay apparatus such as a DVD player, a network connection such as an internet connection and so on.

Figure 2:
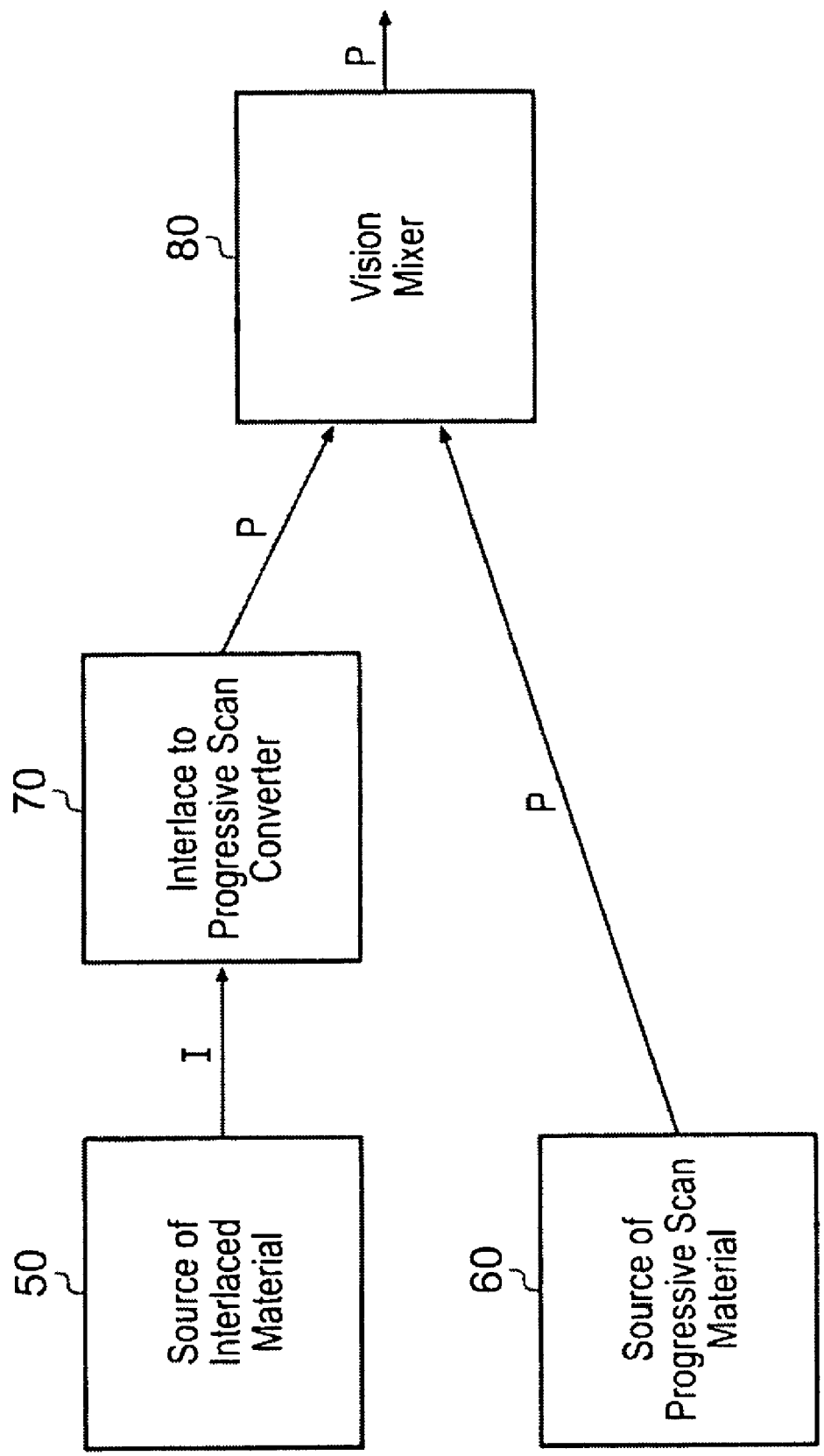
FIG. 2 schematically illustrates video mixing operation in a studio environment.

FIG. 2 schematically illustrates a video mixing operation in a studio environment, in order to give another example of the use of interlace to progressive scan conversion. Here, a source of interlaced material 50 and source of progressive scan material 60 are provided. These sources could be cameras, video replay apparatus such as video tape recorders or hard disk recorders, broadcast receivers or the like.

The interlaced output from the source of interlaced material 50 is supplied to an interlace to progress scan converter 70 to generate a progressive scan signal. This can be processed by the vision mixer 80 along with the progressive scan material from the source 60 to generate a processed progressive scan output. Of course, the progressive scan output of the vision mixer 80 can be converted back to an interlaced format if required, e.g. for subsequent broadcast or recording. It will also be appreciated that the vision mixer 80 is just one example of video processing apparatus; instead, a digital video effects unit, for example, could be used at this position in FIG. 2.

Figure 3:
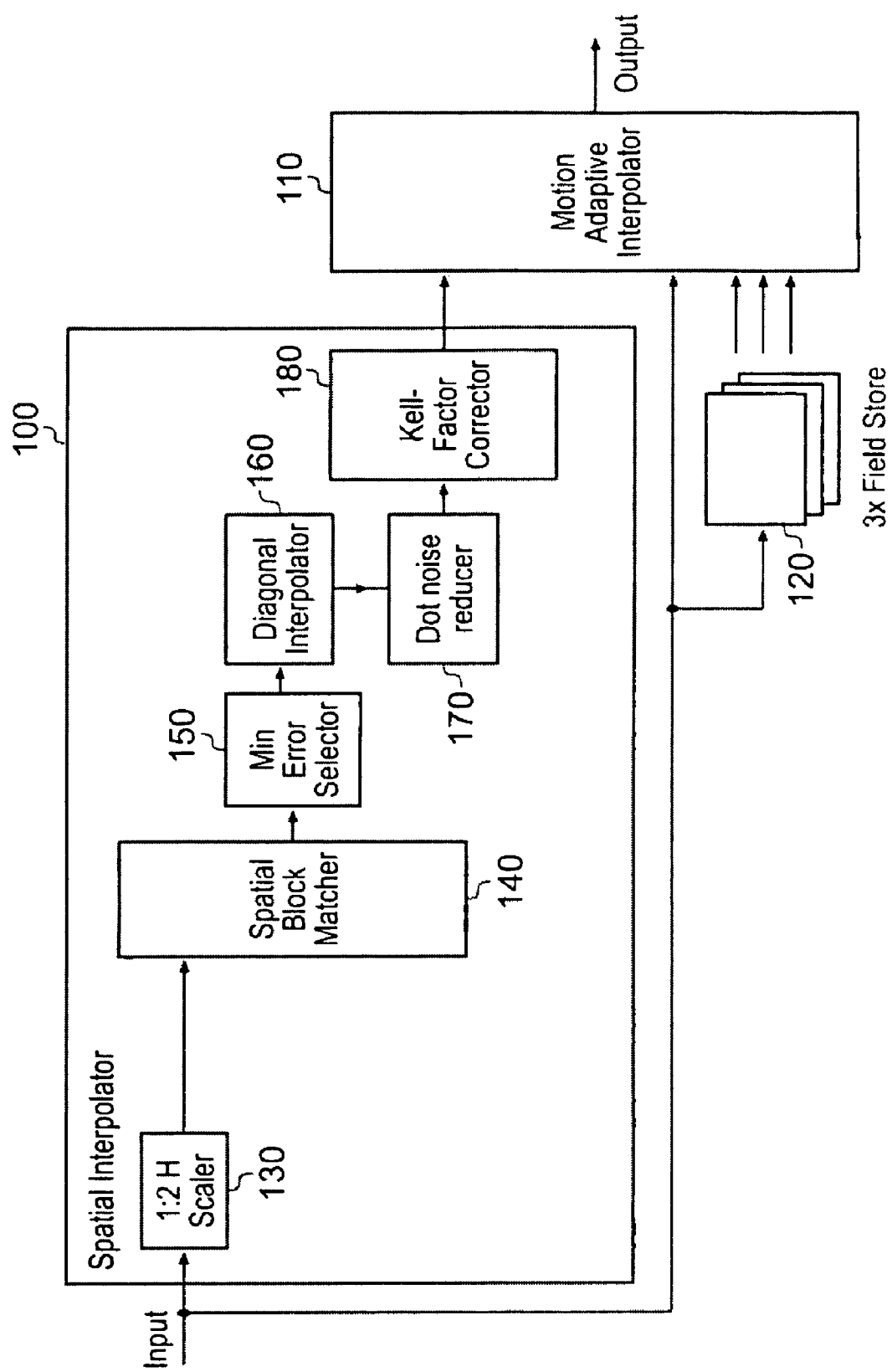
FIG. 3 schematically illustrates an interlace to progressive converter.

FIG. 3 schematically shows an interlace to progressive scan converter. In general terms, the converter comprises an intra-field interpolator such as a spatial interpolator 100, a motion adaptive interpolator 110 and a set of three field stores 120.

The converter of FIG. 3 operates to generate output progressive scan frames at the same repetition frequency as the input interlaced fields. Therefore, a main requirement of the converter is to generate the "missing" pixels in each interlaced field to turn that interlaced field into a progressive scan frame. This can be achieved in one of two ways. On one hand, the spatial interpolator 100 generates the "missing" pixels by spatial interpolation within the field concerned. In other words, this is an intra-field operation. On the other hand, the motion adaptive interpolator generates the missing pixels by inserting pixels from an adjacent field of the opposite polarity. This is valid only if there is no image motion between the fields, so the basic organisation of FIG. 3 is that the output of the spatial interpolator 100 is used at image positions where image motion is detected, while the output of the motion adaptive interpolator 110 is used at pixel positions where image motion is not detected. For simplicity of operation, the spatial interpolator operates at each pixel position, and the motion adaptive interpolator either selects the output of the spatial interpolator, or selects a pixel from another field of the opposite polarity for output, or mixes the two.

The motion adaptive interpolator will be described in more detail below. First, the spatial interpolator will be briefly described.

The spatial interpolator comprises a 1:2 horizontal pixel scaler 130, a spatial block matcher 140, a minimum error selector 150, a diagonal interpolator 160, a dot noise reducer 170 and a Kell-factor corrector 180. The operation of each of these is summarised below.

The scaler 130 uses horizontal linear interpolation to generate one additional pixel value between each two pixels of the input interlaced field (i.e. a 1:2 scaling operation). So, the horizontal resolution (at least in terms of number of available pixel values) is doubled, but no difference is made at this stage to the vertical resolution.

The overall operation of the spatial block matcher 140 and the diagonal interpolator 160 is to detect the orientation of an image feature relevant to a pixel position where a new pixel is to be interpolated, and then to apply an interpolation along that image feature direction. So, if a current pixel position to be interpolated lies within a diagonal image feature (a line, an edge etc.) at, say, 45° to the horizontal, interpolation of that new pixel would take place along that 45° direction. This can tend to give a better output result than restricting the interpolation to horizontal or vertical interpolation. A key part of this process, clearly, is therefore to detect the direction of an image feature at each pixel position.

Figures 4A, 4B, 4C:
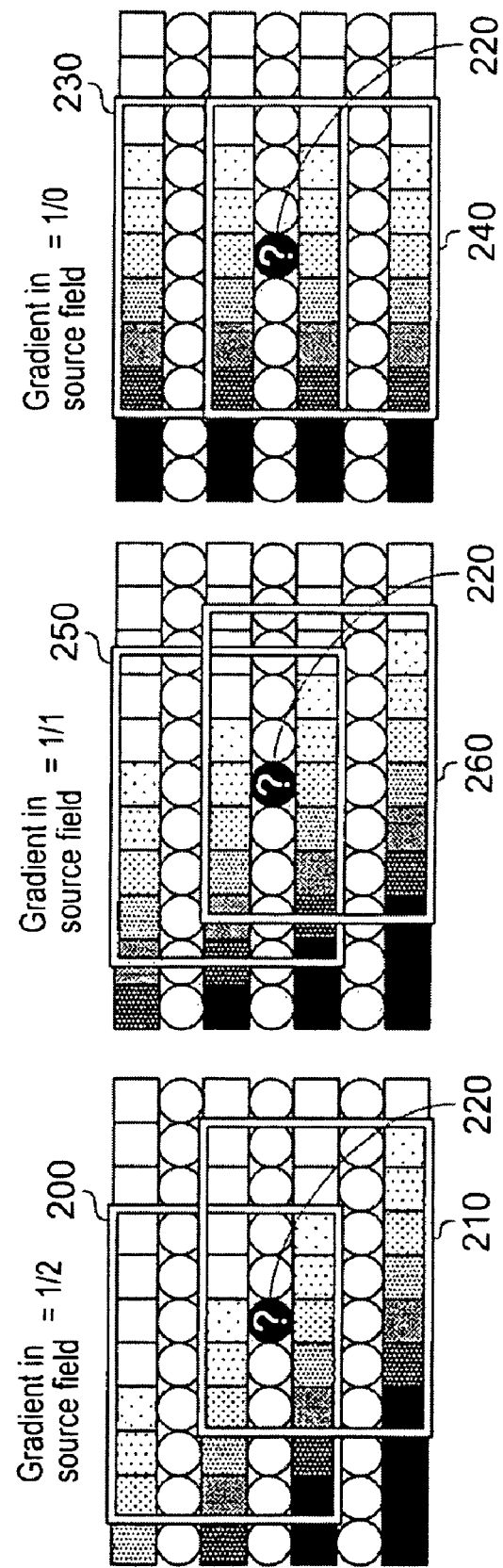
FIGS. 4a to 4c schematically illustrate gradient detection.

Referring now to FIGS. 4A-4C, this detection is carried out using a block matching process. FIG. 4A schematically illustrates a successful block match between two blocks 200, 210 of pixels around the position of an unknown pixel 220 (a circle with a question mark inside). Indeed, the notation used in the present drawings is that a square indicates a known pixel whereas a circle indicates a pixel to be interpolated by the diagonal interpolator 160. The shading in FIGS. 4A to 4C is a schematic representation of an image feature.

So, referring to FIG. 4A, a successful block match is obtained between the blocks 200, 210 around the unknown pixel position 220, indicating a gradient of an image feature of 1/2.

Turning now to FIG. 4C, an image feature is vertical and there is again a successful block match between overlapping blocks 230, 240.

However, in FIG. 4B, the image feature has a gradient of 1/1. It is not possible to obtain a successful block match with the blocks at integral pixel positions. A successful match between blocks 250, 260 occurs at a half integral pixel position. Accordingly, in order to detect gradients of this nature (indeed any gradients sharper than 1/2), it is necessary to operate at a sub-pixel accuracy. In the present case, a half-pixel accuracy was adopted, by using pixels from the 1:2 scaler. If a greater accuracy still was used, (e.g. quarter-pixel accuracy) then gradients yet closer to vertical could be detected.

FIGS. 5 and 6A to 6E schematically illustrate the spatial block matching operation.

As noted above, spatial block matching is carried out at sub-pixel accuracy; in this case half-pixel accuracy.

A range of block sizes is used, with corresponding search ranges (maximum displacements relative to the pixel position under test). Taking into account the 1:2 scaling operation, example block sizes and search ranges are given in the following table:

| Block Size (in scaled pixels) | Search Range (in scaled pixels) |
|---|---|
| 3v × 5h | 0h |
| 3v × 5h | ±1h |
| 3v × 7h | ±2h |
| ... | ... |
| 3v × 41h | ±19h |

FIG. 5 schematically illustrates a block match operation between two blocks of 3v (vertical) by 7h (horizontal) pixels 300, 310, around an unknown pixel position 320. The variable d signifies a horizontal displacement of the block's horizontal centre from the pixel position under test. A condition applied to the block matches is that the blocks must always overlap the pixel position under test. Also, the blocks are shown displaced in integral numbers of real pixel displacements (so a displacement of m corresponds to a displacement of 2m interpolated pixels). Accordingly, the particular block size shown in FIG. 5 allows nine possible tests including at a displacement of −2 pixels (FIG. 6A) −1 pixel (FIG. 6B), 0 pixels (FIG. 6C), +1 pixel (FIG. 6D), and +2 pixels (FIG. 6E).

Note that the displacement is indicated as a displacement from the centre. The two blocks are displaced by equal amounts, though in opposite directions. Symmetrical displacements are used because otherwise the block matching could detect lines or edges which are not relevant to the pixel under test.

A sum of absolute differences (SAD) is calculated for each block match. This is defined as:

$$SAD(x, y, d, n) = \sum_{dx=-n}^{n} \sum_{dy=-3,-1,1} \sum_{RGB/YCbCr} |p(x-d+dx, y+dy) - p(x+d+dx, y+dy+2)|$$

where x, y represent the current pixel co-ordinate (y being a frame line number), d is the displacement being tested, and n is the "radius" of the block (the block width is n'=2n+1).

In general terms, the SAD values for three colour components (red, green and blue) are combined, and a minimum normalised SAD value determines a gradient for interpolation. Various checks are made to avoid poor interpolation, as described below.

Figure 7A:
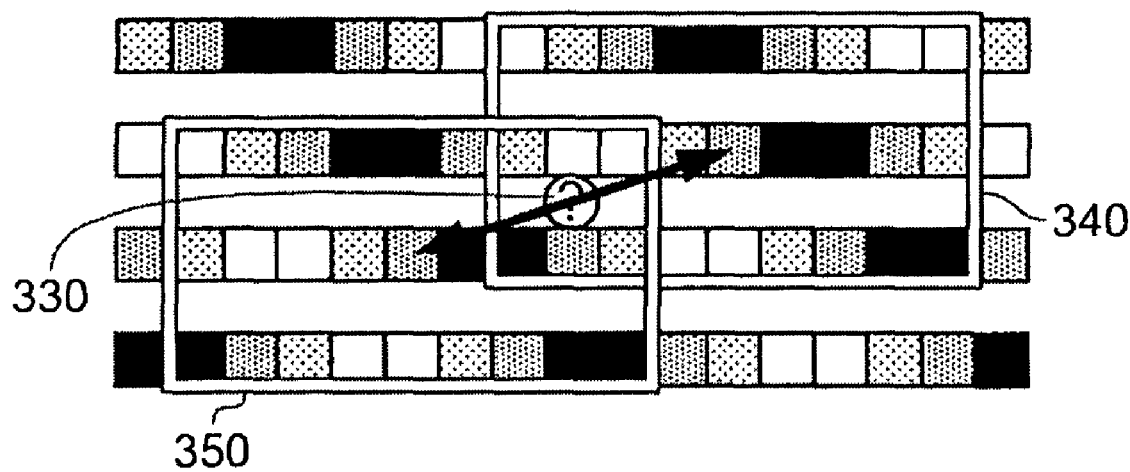
FIGS. 7a and 7b schematically illustrate an alias situation.
Figure 7B:
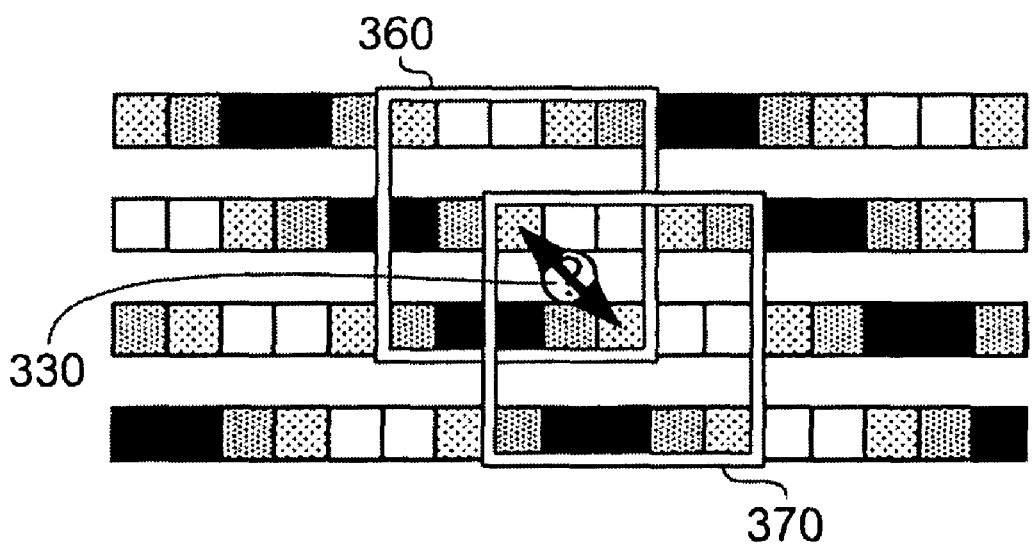

Measures are taken to avoid problems caused by alias situations. FIGS. 7A and 7B illustrate a possible alias situation.

Referring to FIG. 7A, a block match between blocks 340 and 350 suggests that an unknown pixel 330 should be a dark grey colour. Here, the block match is 100% successful and so the SAD value would be zero (note that this is a schematic example!)

However, in FIG. 7B, a block match between blocks 360 and 370 is also 100% successful, again giving a SAD value of zero. The block match of FIG. 7B suggests that the unknown pixel 330 should be a light grey colour.

This conflict of block match results is a product of aliasing between the closely spaced diagonal image features in the image portions shown in FIGS. 7A and 7B. While it may at first appear that either diagonal line is equally valid (i.e. a steep diagonal line from upper left to lower right or a more gentle diagonal line from upper right to lower left), a processing rule has been set up to allow an appropriate selection to be made.

The basis of the rule is that the block match process is restricted so that only areas considered to be "line segments" are detected. That is to say, each block in a block match should contain a line segment.

A digitised line segment is considered to have two properties. Firstly, it is monotonic along the central scan line row of the block in question, and secondly there is a vertical transition between scan lines in the block in question. The way in which these properties may be tested will be described with reference to FIGS. 8A to 8D.

In FIG. 8A, a source field contains multiple diagonal lines. FIG. 8B schematically illustrates one row of pixels within the image of FIG. 8A. FIGS. 8C and 8D illustrate the two edges of the diagonal line shown in FIG. 8B. It will be seen that each of these edges has a region of pixels which show a monotonic variation in luminance. Also, referring back to FIG. 8A, it can be seen that such segments exhibit a vertical transition between adjacent rows of pixels.

So, turning back to FIGS. 7A and 7B, the block match of FIG. 7A would be rejected in favour of the block match of FIG. 7B according to the rule described above. This is because the central line of pixels of the two blocks of FIG. 7B shows a monotonic variation in luminance, whereas the centre line of pixels of the blocks 340, 350 in FIG. 7A does not.

The tests are performed separately in respect of each of the colour components (e.g. R, G and B). All three tests must be passed separately. Alternatively, for example to save hardware, fewer than three tests could be performed. For example, only the luminance, or only one colour component, might be tested. Of course, a YCbCr or YPbPr representation could be tested instead.

The diagonal interpolator 160 is a simple pixel averager: given a direction it picks the pixel in that direction on the line below and the pixel in that direction on the line above and averages them.

The dot noise reducer 170 involves a process which is applied to the output of the diagonal interpolator 160. A test is applied to detect whether an interpolated pixel lies within the maximum and minimum values of four neighbouring vertical and horizontal pixels, i.e. the pixels immediately above, below, left and right of the interpolated pixel. Note that the pixels above and below the interpolated pixel will be real pixels, whereas those to the left and right will be interpolated themselves.

If the interpolated pixel does not lie within this range, then; Let v be the original value of the pixel under consideration, and let v' be v, clipped to lie within the range of the four locally neighbouring pixels.

Let the new pixel value be kDNR v'+(1−kDNR)v, where kDNR is a programmable constant.

The operation of the Kell-factor corrector 180 will now be described.

In the present discussion, references to the Kell-factor are simply to help explain the operation of this part of an exemplary system. What the filter is actually exploiting is simply the knowledge that the source image did not use the full bandwidth available to it, whether that is because of scanning artefacts or because of a low pass filtering process.

The Kell-factor is a quantity which represents a property of progressive scan and interlaced images. In order to represent the information being scanned, it is generally considered that only 70% (the Kell-factor) of the possible vertical bandwidth is (or should be) represented. Hence when performing an interlace to progressive scan conversion, it is potentially hazardous to attempt to produce a full vertical bandwidth image. Instead, a compensation to account for a Kell-factor of less than unity may be used.

One method to compensate for the Kell-factor would be to use a 70% bandwidth filter on the frame output of any interlace to progressive scan algorithm. However, one of the fields in the frame is 'real' data—i.e. it was sampled correctly, so the content arising from that field must by definition be perfect. Thus a method to filter just the interpolated lines is used.

Figure 9A:
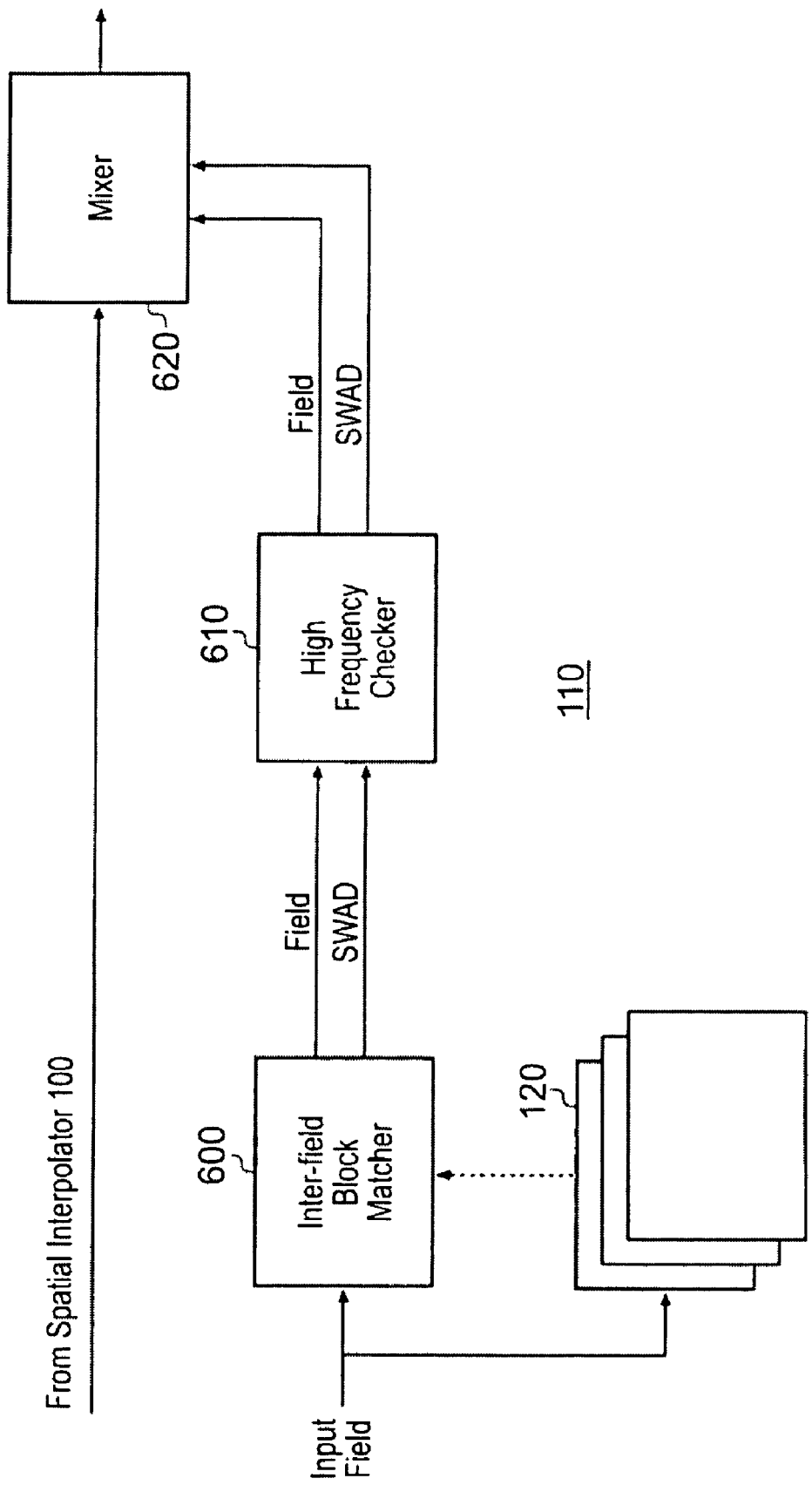
FIG. 9a schematically illustrates a motion adaptive interpolator.

FIG. 9a schematically illustrates the operation of the motion adaptive interpolator 110. The interpolator 110 comprises and inter-field block matcher 600, an optional high frequency checker 610 and a mixer 620.

Figure 9B:
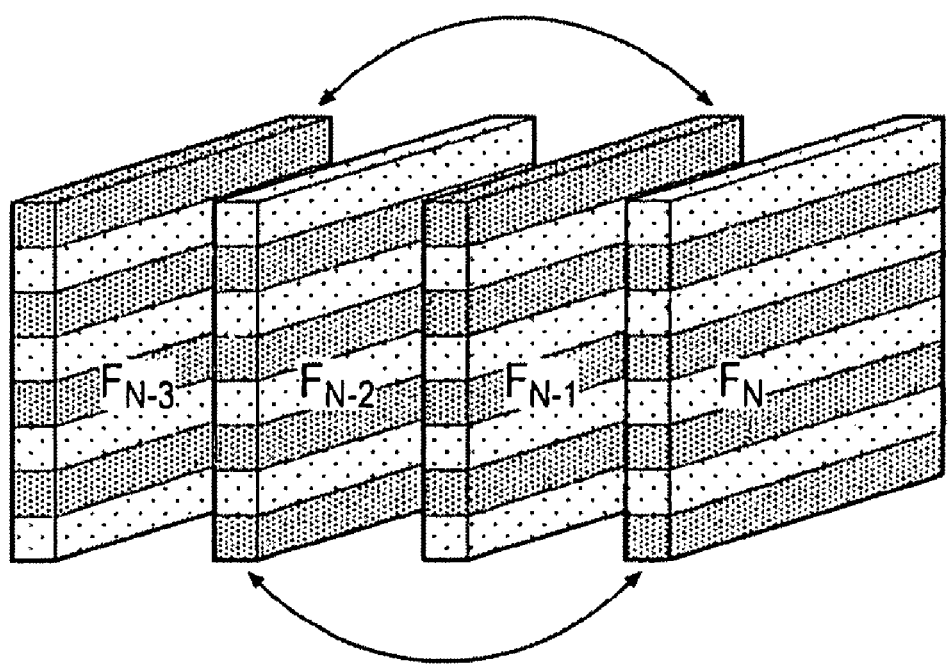
FIG. 9b schematically illustrates motion detection between successive video fields.

The inter-field block matcher 600 uses data from the current input field and the three field stores 120 to carry out inter-field motion comparisons. This involves comparing blocks of pixels the current field ($F_N$ in FIG. 9b) with correspondingly positioned blocks in the previous field of the same type ($F_{N-2}$) and likewise comparing the preceding field ($F_{N-1}$) and the previous field of the same type ($F_{N-3}$). The results of these comparisons are used to detect a degree of motion in the image.

In particular, weighted sums of absolute differences (SWADs) are generated as follows.

Four block matches are performed to produce two SWADs, $SWAD_{AREA}$ and $SWAD_{LOCAL}$. These are:
 a 5h×4v weighted block match on fields $F_N$ and $F_{N-2}$.
 a 5h×3v weighted block match on fields $F_{N-1}$ and $F_{N-3}$.
 a 1h×1v weighted block match on fields $F_{N-1}$ and $F_{N-3}$.
 a 1h×2v weighted block match on fields $F_N$ and $F_{N-2}$.

Weighted block matches sum weighted absolute differences between coincident pixels, SWAD.

$$SWAD = \sum_{dx=-2}^{2} \sum_{dy=-2,0,2} \sum_{RGB/YCbCr} w(dx, dy)|F_{N-1}(dx, dy) - F_{N-3}(dx, dy)|$$

where $F_{N-1}(dx,dy)$ is the value at the frame-relative position dx, dy to the current pixel.

Typical values for the weights are:

| | |
|---|---|
| 5h × 4v block: | [12/1024 23/1024 28/1024 23/1024 12/1024 |
| | 32/1024 62/1024 77/1024 62/1024 32/1024 |
| | 32/1024 62/1024 77/1024 62/1024 32/1024 |
| | 12/1024 23/1024 28/1024 23/1024 12/1024] |
| 5h × 3v block: | [20/1024 39/1024 48/1024 39/1024 20/1024 |
| | 48/1024 94/1024 117/1024 94/1024 48/1024 |
| | 20/1024 39/1024 48/1024 39/1024 20/1024] |
| 1h × 2v block: | [128/256 |
| | 128/256] |
| 1h × 1v block: | [255/256] - effectively no weighting. |

Summing the first two SWADs gives an area-based block match, $SWAD_{AREA}$

Summing the latter two SWADs gives a localised block match, $SWAD_{LOCAL}$

All three colour components contribute to the SWADs in the same manner. The system need only maintain a SAD of the three components for each pixel, which is then weighted and combined with the values from the other pixels in the block. This means that this aspect of the process requires only 5 line stores of about 10 bpp (bits per pixel).

Optionally, the high frequency checker 610 is arranged to detect high frequencies in the input fields. The algorithm is based on the following principle. If interleaving the two source fields produces a lot of high frequency energy, then it is appropriate to try to make sure that the inputs are reasonably static. Only static video can produce reliable high frequencies; highly aliased motion can produce high frequencies, but this is not a desirable situation for inter-field interpolation. If motion is present, then high frequencies may be produced where the fields are incorrectly interleaved.

Figure 10:
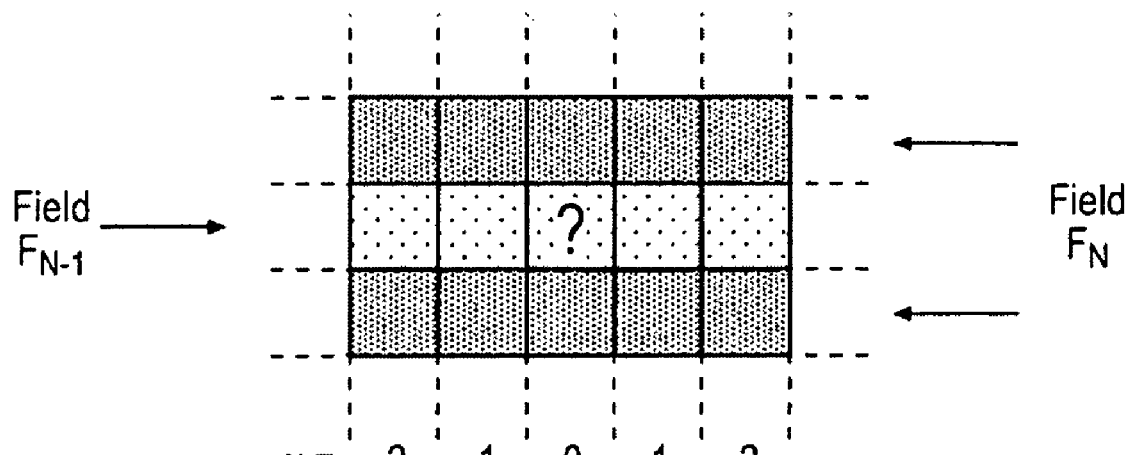
FIG. 10 schematically illustrates a high frequency check operation.

Referring to FIG. 10, the high frequency checker uses the lines above and below the currently interpolated pixel from the current field $F_N$ and the line from the preceding field $F_{N-1}$ that corresponds to the missing line. The HFC may be considered as a 5×3 pixel neighbourhood check.

Let $HFC_{thresh1}$ and $HFC_{thresh2}$ be two programmable constants, with the former greater than the latter.

Set a flag: exceededHighEnergy=false

Over each component (or a subset of them) (RGB/YPbPr)—where YPbPr indicates the colour space in a high definition system, in a similar way to YCbCr in a standard definition system:

Set energy=0

For the pixels having a horizontal position x=−2,−1,0,1,2 (relative to the current pixel), let the interleaved ($F_{N-1}$) field value be $v_0$, and the current field value of the line above and below be $v_{-1}$ and $v_1$, then:

if $v_0 < \min(v_1, v_{-1})$, set diff=min($v_1, v_{-1}$)−v0
 else if v0>max(v1, v−1), set diff=v0−max(v1, v−1)
 else set diff=0
 If (diff>$HFC_{thresh1}$), set energy=energy+($HFC_{thresh1}$−$HFC_{thresh2}$)*weighting[x]
 else if (diff>$HFC_{thresh2}$), set energy=energy+(diff−$HFC_{thresh2}$)*weighting[x]
 If energy>$HFC_{allowance}$, set flag exceededHighEnergy=true This ends the processing carried out over each component.

Subsequently, if exceededHighEnergy=true, increase $SWAD_{AREA}$ by a programmable constant value, $HFC_{penalty}$.

The increase in $SWAD_{AREA}$ will tend to act against the use of the motion adaptive pixel at that output position.

The mixer 620 operates according to the criteria $SWAD_{AREA}$ and $SWAD_{LOCAL}$ and also various thresholds $thresh_1$, $_{2, etc.}$ If $SWAD_{LOCAL}$>$thresh_1$, use only spatially interpolated field, $F_{N'}$ Else if $SWAD_{AREA}$>$thresh_2$, use only spatially interpolated field, $F_{N'}$, only Else if $SWAD_{AREA}$<$thresh_3$, use only field $F_{N-1}$ Else mix field $F_{N-1}$ and $F_{N'}$:

let $\alpha$=($thresh_2$−$SWAD_{AREA}$)/($thresh_2$−$thresh_3$)

The resulting pixel value=$\alpha F_{N-1}$+(1−$\alpha$)$F_{N'}$. In other words, $\alpha$ represents pixel motion and determines contributions from the intra and inter-field interpolators.

Whilst only $F_{N-1}$ and $F_{N'}$ are mixed in the above equation, it will be appreciated that additional image fields or portions thereof may be mixed with $F_{N-1}$ and $F_{N'}$ at a given pixel position, for example the unfiltered lines of $F_N$ for alternate lines of the image, or earlier image field $F_{N-3}$ if there is substantially no motion at all.

The presence of noise in successive fields of the video input, however, can result in apparent motion being detected where in fact there is none. Such noise can affect the SWAD difference calculations and can also resemble high-frequency artefacts, affecting the high frequency checking.

A Gaussian filter that horizontally filters the input field data used for motion detection helps to reduce noise and hence reduce spurious motion detection. The longer the filter, the more noise is removed and so the less motion is detected. However, if the filter becomes too large, then the detection of valid motion can be compromised. In practice, a 7-tap filter (7h×3v) provides a good compromise.

Figure 11:
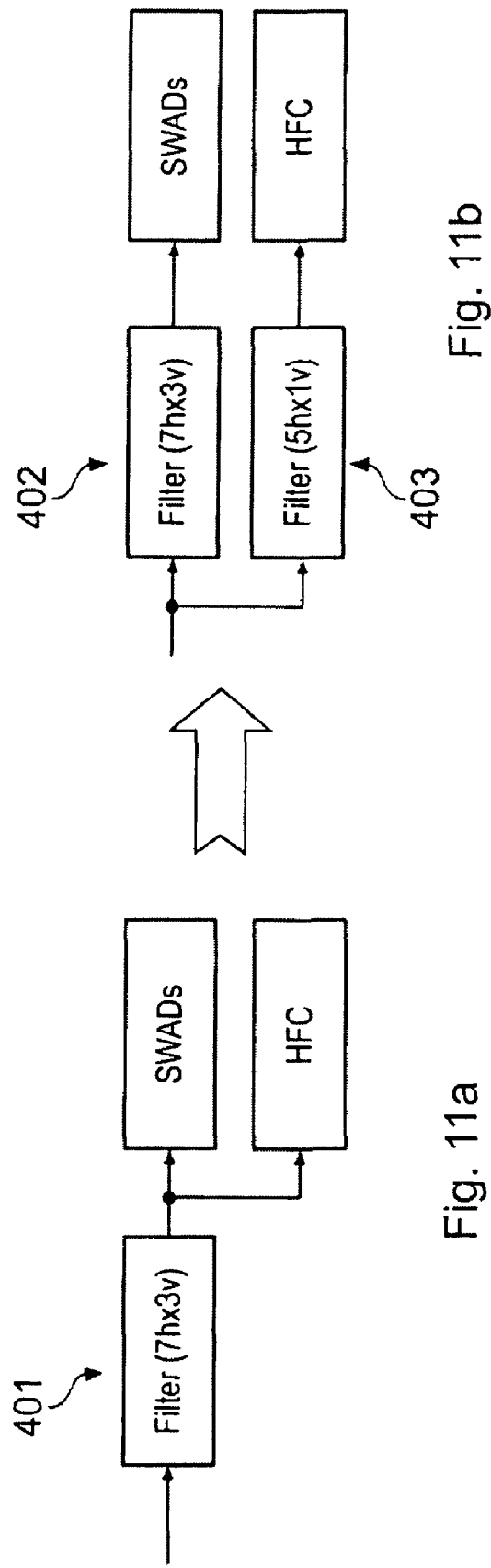
FIG. 11 schematically illustrates an arrangement of filters.

However, the HFC and SWAD calculations differ in their sensitivity to noise. Referring to FIGS. 11a and 11b, the common input Gaussian filter 401 as described above and shown in FIG. 11a is replaced by the new arrangement of FIG. 11b, in which two different filters 402, 403 are used, one for each of the inputs to the HFC and the SWAD calculations respectively. The SWAD calculation filter remains a similar 7-tap filter (7h×3v) 402, whilst the HFC calculation filter is reduced to a 5-tap filter (5h×1v) 403. Consequently the HFC calculation filter overall increases its sensitivity to high-frequency features. In particular, removing vertical filtering (by moving from 3v to 1v), which impacts on the detection of vertical motion in fine horizontal lines such as hair in an image, improves the sensitivity.

Significantly, however, the $SWAD_{AREA}$ and $SWAD_{LOCAL}$ calculations themselves are based on different block sizes. (This enables $SWAD_{LOCAL}$ to be used to finely adjust the edges of regions where motion is detected). Consequently, these calculations therefore also have different sensitivities to noise. In particular, $SWAD_{LOCAL}$ shows a greater sensitivity to noise in the input data than $SWAD_{AREA}$, potentially resulting in spurious motion detection. In principle, splitting the filter operation yet further so that inputs for $SWAD_{LOCAL}$ calculations are subject to a longer filter than that used with $SWAD_{AREA}$ may be applicable. However, this is an impractical solution as storing two copies of the previous fields N-1, N-2 and N-3, each filtered in two different ways, would be costly in terms of memory and processing. In addition, smoothing the input data too much with a long filter could affect the ability of $SWAD_{LOCAL}$ to provide fine adjustment to motion region edges.

Figure 12:
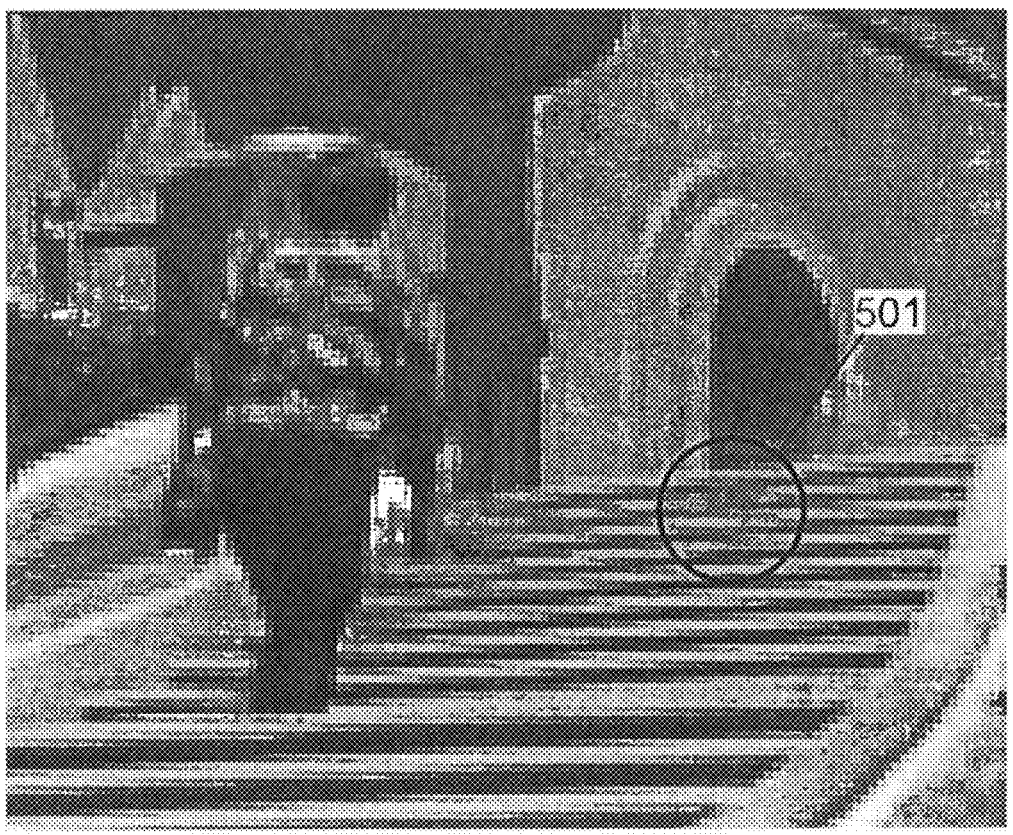
FIG. 12 illustrates the effect of incorrectly selecting different conversion processes within an image field.

As noted above, when the $SWAD_{LOCAL}$ value is greater than a threshold $thresh_1$, motion is detected in the local area. If motion is detected in the local area, then only spatial interpolation is used. However, as $SWAD_{LOCAL}$ is comparatively sensitive to noise, it can declare noise artefacts to signify motion, resulting in the use of localised regions of spatial interpolation centred on these noise artefacts. Thus 'motion noise' can result in inconsistent use of interpolation strategies within an otherwise uniform image region, resulting in turn in interpolation discontinuities, and the use of spatial interpolation where it is not needed. The result of sensitivity to motion noise may be seen in the example of FIG. 12. In this figure, the steps are successfully interpolated by interleaving pixels from successive fields, except in the identified region 501, where the detection of apparent motion due to noise by $SWAD_{LOCAL}$ triggered the unnecessary use of spatial interpolation around the noise source. Consequently, in the identified region, spatial interpolation has resulted in blurring between the steps as pixels above and below the noisy region are not of the correct colour for the middle part of the step. The result of using inter-field interpolation is clearly not as good as the inter-field interpolation in areas determined as being static.

To address this problem, in an embodiment of the present invention the use of $SWAD_{LOCAL}$ is made conditional. Specifically, $SWAD_{LOCAL}$ is only used if $SWAD_{AREA}$ detects sufficient motion in the same segment of the image field. This exploits the observation that in real video images, it is unlikely for one or two pixels to show motion in the absence of motion within the surrounding segment.

Use of $SWAD_{LOCAL}$ is therefore made dependent on whether a ratio of pixels detected in motion to pixels not detected in motion—but for which motion detection is deemed reliable—exceeds a threshold. The determination of this ratio is detailed below.

In an embodiment of the present invention, pixels are placed in one of three categories:
Complex—motion information should be used from neighbouring pixels as the motion information from these pixels is considered to be unreliable.
Mid-Complex—motion information from these pixels is considered to be reliable.
Plain—motion information from these pixels is considered to be indeterminate.

If a region is 'plain', then it is not possible to conclude whether motion is present. If a region is 'complex', then in principle it should be static (even if possibly due to aliased motion), and should not be a considered a reliable source of motion information. The use of $SWAD_{LOCAL}$ is therefore determined on the basis of the ratio of moving to static mid-complex pixels.

A mid-complex pixel is defined as being any pixel that is not complex or plain.

For a pixel position x, y, and colour channel c (of for example red, green and blue), then a pixel is complex if, for any channel c, $|F_N(x,y,c)-F_{N-2}(x,y,c)|+sd<|F_{Sx}(x,y,c)-F_{N-1}(x,y,c)|$ and $|F_{N-1}(x,y,c)-F_{N-3}(x,y,c)|+sd<|F_{Sx}(x,y,c)-F_{N-1}(x,y,c)|$ Where sd is the standard deviation of the pixels in the current segment, calculated in field N-1, $F_N(x,y,c)$ is the current input field, $F_{N-1}(x,y,c)$, $F_{N-2}(x,y,c)$ and $F_{N-3}(x,y,c)$ are previous input fields, and $F_{Sx}(x,y,c)$ is the spatially interpolated version of the current input field. Optionally, the standard deviation can be clipped to a predetermined maximum value.

It will be appreciated that an alternative to a standard deviation, such as a sum of absolute differences, could be used with appropriate scaling.

In each case in the above pair of inequalities, the left hand side is a measure of how static the values appear to be, while the right hand side is a measure of how different the spatial and interleaved images are.

In the case where there is insufficient storage to fully hold the N-3 field, a version based on the sum of the three colour channels $\Sigma_{c=red,green,blue}|F_{N-1}(x,y,c)-F_{N-3}(x,y,c)|$ may be used instead by the second inequality.

Likewise, for a pixel x, y, and colour channel c (of for example red, green and blue), then a pixel is plain if, for all channels c, $|F_{Sx}(x,y,c)-F_{N-1}(x,y,c)|<sd$ and $|F_N(x,y,c)-F_{N-1}(x,y,c)|<sd$ Where the terms are as defined above.

A mid-complex pixel is therefore any pixel that is not determined to be complex or plain according to the above inequality tests.

It will be appreciated that references to 'any' or 'all' colour channels encompasses systems with a single colour channel, such as a luminance channel.

It will likewise be appreciated that by reversing the above four inequalities, i.e. by changing '<' to '>=', and changing 'and' to 'or', the inequalities together become a positive test for mid-complexity pixels.

When a mid-complex pixel is determined, a segment statistic 'count mid-complex' (CMC) is incremented. If the $SWAD_{AREA}$ value is also greater than a threshold value, a segment statistic 'count motion mid-complex' (CMMC) is also incremented.

Figure 13:
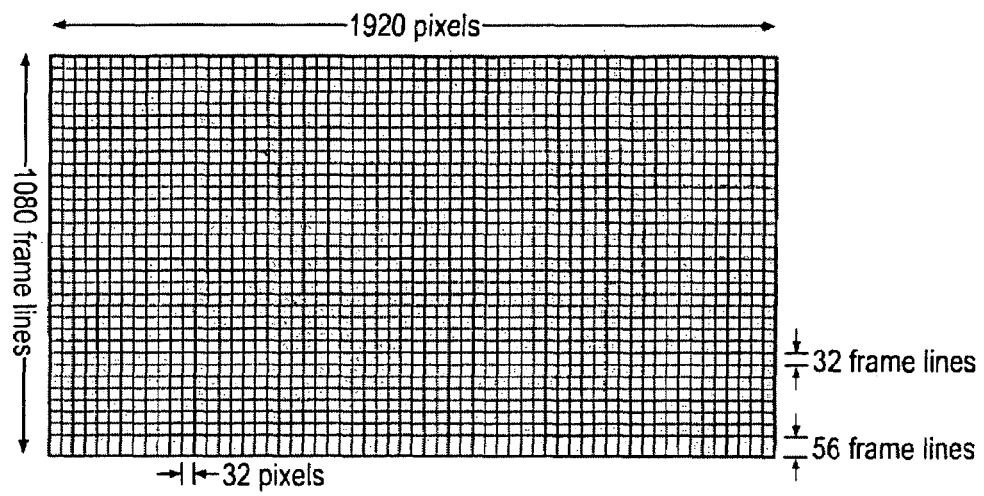
FIG. 13 schematically illustrates an image field.

Referring to FIG. 13, the segments over which these statistics are generated are created by splitting a field into segments of size 32 pixels×16 field lines. At the field edges, segments are made bigger to accommodate the remaining edge pixels, rather than having smaller edge segments that may be statistically unsound. In the case of a 1920×1080 high definition image field as shown in FIG. 13, there is an exact horizontal fit but not an exact vertical fit, thus requiring vertically larger segments at the bottom of the image as shown.

$SWAD_{LOCAL}$ is then only used if the ratio of CMMC:CMC exceeds a threshold value. Typically, this is expressed as CMMC>CMC*$Constant_1$, where $Constant_1$ determines the desired threshold value. Optionally, an additional requirement that CMMC>$Constant_2$ (i.e. that a minimum number of mid-complex pixels indicate motion) can be imposed. Moreover, the threshold value can be set in accordance with the variance of the segment. For example, one of four predetermined threshold values can be selected according to the variance level.

By implementing the above conditional use of $SWAD_{LOCAL}$, fine motion detection can therefore still be applied around the edges of a region of motion, whilst mitigating the effects of motion noise in generally static regions. This serves to improve overall picture quality in the interlace to progressive scan conversion.

In an embodiment of the present invention, further processes are made dependent upon the above complexity categorisations:

Pixels categorised as complex derive a replacement α value from the previous field data, based on the assumption that in principle complex pixels are part of a static region of the image and thus share common local attributes with the previous image field.

For the derivation, image segments from the previous field are each notionally split into four quadrants, and a quadrant based segment statistic countQuarters is used to count mid-complex pixels categorised as in motion, such that sum(countQuarters)=CMMC for a given image segment.

Figure 14:
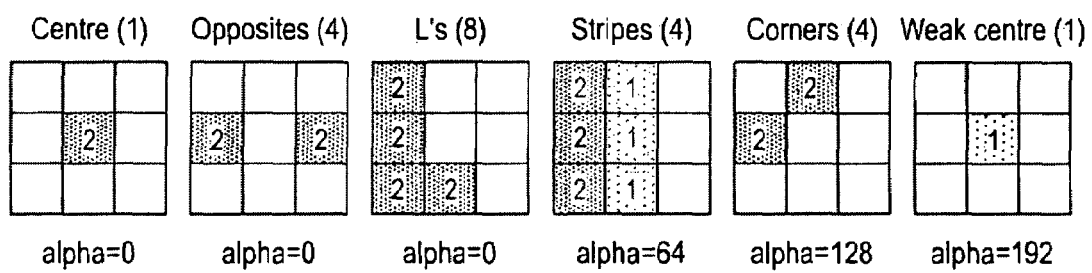
FIG. 14 schematically illustrates a series of template patterns.

Referring to FIG. 14, the nine quadrants surrounding the current pixel (i.e. with the current pixel in the middle) are categorised according to the apparent level of motion they contain.

Level 2 indicates a high level of motion, when countQuarter*$scale_2$>CMC and countQuarter>$min_2$; that is, when a sufficient proportion of mid-level pixels are found to indicate motion (determined by $scale_2$), and these pixels also exceed a 'level 2' absolute minimum number (determined by $min_2$)

Level 1 indicates some motion is present, when countQuarter*$scale_1$>CMC and countQuarter>$min_1$; that is, when a sufficient proportion of mid-level pixels are found to indicate motion (determined by $scale_1$), and these pixels also exceed a 'level 1' absolute minimum number (determined by $min_1$)

Level 0 indicates substantially no motion, when the criteria for levels 2 and 1 are not met. These are shown as blank areas in the drawing.

Typically, the calculation of the motion level for each quadrant is performed during the processing of the previous image field, and thus only the motion level data (0, 1 or 2) for each quadrant needs to be stored for use by the subsequent current field.

The distribution of 0, 1, 2 level values for the quadrants forms a pattern around the current pixel.

This pattern is tested against 22 templates. The six generative templates, rotated or mirrored to form a total of 22 templates, are illustrated in FIG. 14. Only the numbered quadrants of each template are tested in each case. The lowest α value corresponding to a matching template is assigned to the pixel. In other words, of the α values written underneath each template, the lowest such α value of any templates which match the currently tested arrangement is adopted. If no template matches, then an α value of 1 is assigned.

In an embodiment of the present invention, a further test to determine if a pixel should be categorised as mid-complex may be applied, the result of which supersedes the previous categorisation of complex, mid-complex or plain if it is found to be mid-complex.

The test is based on the original RGB data without any filtering applied. An inter-field comparison similar to that used for $SWAD_{LOCAL}$ is applied to the RGB data. Consequently, if $$diff_{N,N-2} > pixChangeDiff_{N,N-2}bigThresh \text{ OR}$$

$$diff_{N-1,N-3} > pixChangeDiff_{N,N-3}Thresh \text{ OR}$$

$$(diff_{N,N-2} > pixChangeDiff_{N,N-2}smallThresh \text{ AND}$$
$$diff_{Sx,N-1} > pixChangeDiff_{SxFm}Thresh)$$

then
the pixel is categorised as mid-complex. In this case, its α value is also forced to 0.

In the above test, $diff_{a,b}$ is the absolute sum of differences of the R, G, B components between the two named fields. Typical values for the thresholds are provided in the annex, for a 12-bit video system with a value range of 0-2047 for each pixel. It will be appreciated that different threshold values would apply for different bit depths.

Figure 15:
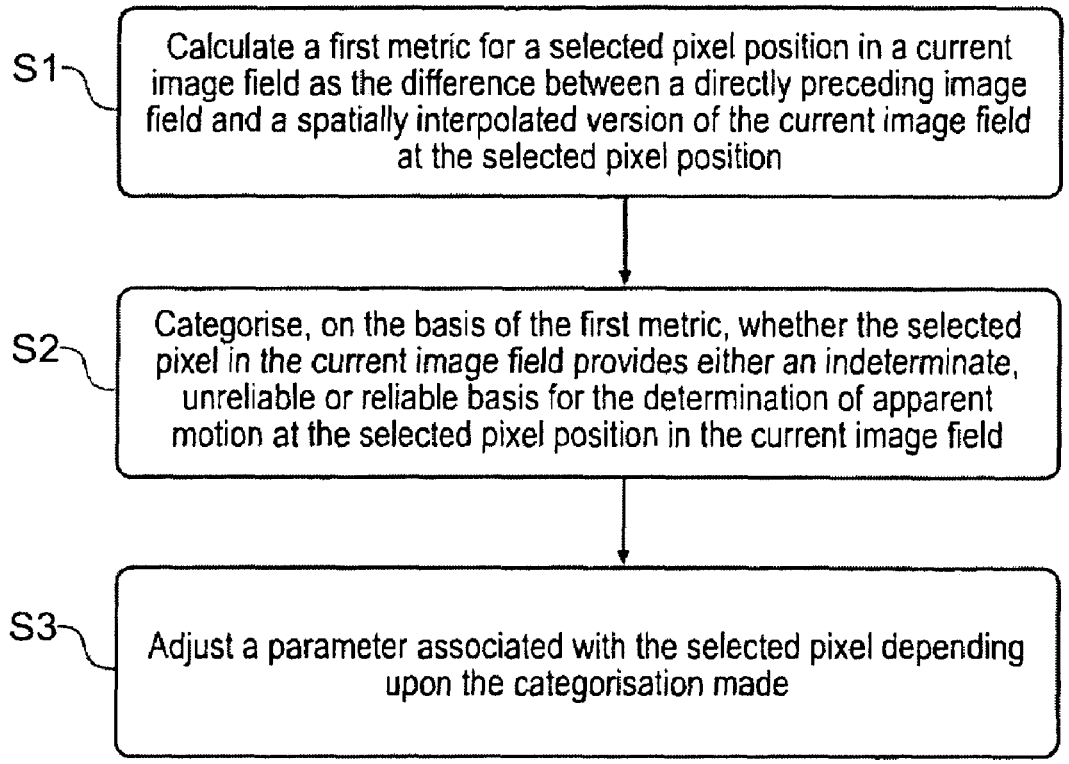
FIG. 15 is a flowchart illustrating a method of image processing.

A corresponding method of image processing for converting interlaced images to progressive scan images is now described with reference to FIG. 15, and comprises the steps of:

calculating (s1) a first metric, the first metric being the difference between a directly preceding image field and a spatially interpolated version of a current image field, at a selected pixel position in the current image field;

categorising (s2), on the basis of the first metric, whether the selected pixel in the current image field provides either an indeterminate, unreliable or reliable basis for the determination of apparent motion at that selected pixel position in the current image field; and adjusting (s3) a parameter associated with the selected pixel depending upon the categorisation made.

It will be appreciated by a person skilled in the art that variations in the above method corresponding to the various operations of the apparatus disclosed herein are considered to be within the scope of the present invention, including:

deriving a replacement α value from the previous field data for pixels categorised as complex;

matching patterns of quadrants based on motion statistics for the above derivation of α; and determining the mid-complex category directly from unfiltered RGB data.

It will be appreciated by a person skilled in the art that the reference to the mixing of fields $F_{N'}$ and $F_{N-1}$ is one of several potential mixing options available for interlacing images in an image sequence. Generalising $F_{N'}$ to $F_{Sx}$ and $F_{N-1}$ to $F_M$, a selection of interpolation modes may be defined as:

Mode 1: Zero field system delay (as in the description)—
$F_{Sx}$=interpolated field associated with field $F_N$
$F_M$=field $F_{N-1}$
Mode 2: One field system delay, backward mixing—
$F_{Sx}$=interpolated field associated with field $F_{N-1}$
$F_M$=field $F_{N-2}$
Mode 3: One field system delay, forward mixing—
$F_{Sx}$=interpolated field associated with field $F_{N-1}$
$F_M$=field $F_{N'}$.

Consequently, the equation determining a complex pixel would correspond to $$|F_N(x,y,c)-F_{N-2}(x,y,c)|+sd < |F_{Sx}(x,y,c)-F_M(x,y,c)| \text{ and}$$

$$|F_{N-1}(x,y,c)-F_{N-3}(x,y,c)|+sd < |F_{Sx}(x,y,c)-F_M(x,y,c)|;$$

the equation determining a plain pixel would correspond to $$|F_{Sx}(x,y,c)-F_M(x,y,c)| \leq sd \text{ and}$$

$$|F_N(x,y,c)-F_{N-1}(x,y,c)| \leq sd;$$

and the mixed pixel value would correspond to $\alpha F_M + (1-\alpha) F_{Sx}$.

It will be appreciated that the invention can be implemented in programmable or semi-programmable hardware operating under the control of appropriate software. This could be a general purpose computer or arrangements such as an ASIC (application specific integrated circuit) or an FPGA (field programmable gate array). The software could be supplied on a data carrier or storage medium such as a disk or solid state memory, or via a transmission medium such as a network or internet connection, or via combinations of these.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

APPENDIX

Some example Parameters:

| | YPbPr setting | RGB setting |
|---|---|---|
| HFC weighting | [2 4 5 4 2] | [2 4 5 4 2] |
| $HFC_{thresh1}$ | 40 | 40 |
| $HFC_{thresh2}$ | 8 | 8 |
| $HFC_{allowance}$ | 218 | 128 |
| $HFC_{penalty}$ | 10 | 25 |
| thresh1 | 60 | 120 |
| thresh2 | 20 | 50 |
| thresh3 | 25 | 60 |
| pixChangeDiff$_{N,N-2}$bigThresh | 1500 | 1500 |
| pixChangeDiff$_{N,N-3}$Thresh | 200 | 200 |
| pixChangeDiff$_{N,N-2}$smallThresh | 500 | 500 |
| pixChangeDiff$_{SxFm}$Thresh | 1500 | 1500 |
| Constant$_1$ | 32/256 | 32/256 |
| Constant$_2$ | 32 | 32 |

What is claimed is:

1. A method of image processing for image conversion by combining two or more source values in accordance with a mixing parameter to generate an output pixel value, the method comprising the steps of:
    calculating a first metric for a selected pixel at a selected pixel position in a current image field, the first metric being a difference between a directly preceding image field and a spatially interpolated version of the current image field at the selected pixel position;
    categorising, on the basis of the first metric, whether the selected pixel in the current image field provides either an indeterminate, unreliable or reliable basis for a determination of motion at the selected pixel position in the current image field, the selected pixel is categorised as indeterminate when, for all colour channels, the first metric is smaller than a standard deviation of pixel values in a test region surrounding the selected pixel in the current image field and a magnitude of a difference between the current image field and a previous corresponding image field at the selected pixel position is also smaller than the standard deviation of pixel values in the test region surrounding the selected pixel in the current image field; and
    adjusting the mixing parameter associated with the selected pixel depending upon the categorisation made.

2. A method according to claim 1, in which the selected pixel is categorised as indeterminate if:
    for a pixel position x, y and all colour channels c, $$|F_{Sx}(x,y,c)-F_M(x,y,c)| \leq sd$$

$$\text{and } |F_N(x,y,c)-F_{N-1}(x,y,c)| \leq sd$$

where sd is the standard deviation of the pixel values in the test region, calculated in previous image field $F_{N-1}$, $F_N(x,y,c)$ is the current image field, $F_{N-1}(x,y,c)$, is the directly preceding image field, $F_{Sx}(x,y,c)$ is a spatially interpolated version of the current image field $F_N$ or $F_{N-1}$ and $F_M(x,y,c)$ is an available input image field temporally adjacent to $F_{Sx}(x,y,c)$.

3. A method of image processing for image conversion by combining two or more source values in accordance with a mixing parameter to generate an output pixel value, the method comprising:
    calculating a first metric for a selected pixel at a selected pixel position in a current image field, the first metric being a difference between a directly preceding image field and a spatially interpolated version of the current image field at the selected pixel position;
    categorising, based on the first metric, whether the selected pixel in the current image field provides either an indeterminate, unreliable or reliable basis for a determination of motion at the selected pixel position in the current image field, the selected pixel is categorised as unreliable if for any colour channel the first metric is greater than a standard deviation of pixel values in a test region surrounding the selected pixel in the current image field plus a magnitude of a difference between the current image field and a previous corresponding image field at the selected pixel position, and is also greater than the standard deviation of pixel values in the test region surrounding the selected pixel plus a magnitude of a difference between the directly preceding image field and its previous corresponding image field at the selected pixel position; and
    adjusting the mixing parameter associated with the selected pixel depending upon the categorisation made.

4. A method according to claim 3, in which the selected pixel is categorised as unreliable if
    for a pixel position x, y, and any colour channel c, $$|F_N(x,y,c)-F_{N-2}(x,y,c)|+sd < |F_{Sx}(x,y,c)-F_M(x,y,c)|$$

$$\text{and } |F_{N-1}(x,y,c)-F_{N-3}(x,y,c)|sd < |F_{Sx}(x,y,c)-F_M(x,y,c)|$$

where sd is the standard deviation of the pixel values in the test region, calculated in field $F_{N-1}$, $F_N(x,y,c)$ is a current input field, $F_{N-1}(x,y,c)$, $F_{N-2}(x,y,c)$ and $F_{N-3}(x,y,c)$ are previous input fields, $F_{Sx}(x,y,c)$ is a spatially interpolated version of input field $F_N$ or $F_{N-1}$ and $F_M(x,y,c)$ is an available input image field temporally adjacent to $F_{Sx}(x,y,c)$.

5. A method according to claim 3, wherein
    if a selected pixel is categorised as unreliable, the mixing parameter associated with the selected pixel is derived from preceding image field data.

6. A method according to claim 5, comprising the steps of:
    selecting an array of regions centred over the selected pixel;
    categorising each of the regions according to a number of reliable pixels respectively located therein that indicate motion; and determining a mixing parameter value according to a pattern formed by the categorisation of the regions.

7. A method according to claim 6, in which a mixing parameter value is associated with each of a plurality of templates, and a lowest parameter value corresponding with a template that matches all or part of the pattern formed by the categorisation is selected.

8. A method of image processing for image conversion by combining two or more source values in accordance with a mixing parameter to generate an output pixel value, the method comprising:
  calculating a first metric for a selected pixel at a selected pixel position in a current image field, the first metric being a difference between a directly preceding image field and a spatially interpolated version of the current image field at the selected pixel position;
  categorising, based on the first metric, whether the selected pixel in the current image field provides either an indeterminate, unreliable or reliable basis for a determination of motion at the selected pixel position in the current image field; and
  adjusting the mixing parameter associated with the selected pixel depending upon the categorisation made, wherein
  the selected pixel is categorised as reliable if for any colour channel the first metric is not smaller than a standard deviation of pixel values in a test region surrounding the selected pixel in the current image field and a magnitude of a difference between the current image field and a previous corresponding image field at the selected pixel position is also not smaller than the standard deviation of pixel values in the test region surrounding the selected pixel in the current image field; and
  for all colour channels the first metric is not greater than the standard deviation of pixel values in the test region surrounding the selected pixel in the current image field plus the magnitude of the difference between the current image field and the previous corresponding image field at the selected pixel position, or is also not greater than the standard deviation of pixel values in the test region surrounding the selected pixel plus a magnitude of a difference between the directly preceding image field and its previous corresponding image field at the selected pixel position.

9. A method according to claim 8, in which the selected pixel is categorised as reliable if for a pixel position x, y and any colour channel c, $|F_{Sx}(x,y,c) - F_M(x,y,c)| >= sd$ or $|F_N(x,y,c) - F_{N-1}(x,y,c)| >= sd$ and for a pixel position x, y, and all colour channels c, $|F_N(x,y,c) - F_{N-2}(x,y,c)| + sd >= |F_{Sx}(x,y,c) - F_M(x,y,c)|$ or $|F_{N-1}(x,y,c) - F_{N-3}(x,y,c)| + sd > |F_{Sx}(x,y,c) - F_M(x,y,c)|$ where sd is the standard deviation of the pixel values in the test region, calculated in field $F_{N-1}$, $F_N(x,y,c)$ is a current input field, $F_{N-1}(x,y,c)$, $F_{N-2}(x,y,c)$ and $F_{N-3}(x,y,c)$ are previous input fields, $F_{Sx}(x,y,c)$ is a spatially interpolated version of input field $F_N$ or $F_{N-1}$ and $F_M(x,y,c)$ is an available input image field temporally adjacent to $F_{Sx}(x,y,c)$.

10. A method according to claim 8, in which the selected pixel is categorised as reliable if $\text{diff}_{N,N-2} > \text{pixChangeDiff}_{N,N-2}\text{bigThresh}$ OR $\text{diff}_{N-1,N-3} > \text{pixChangeDiff}_{N,N-3}\text{Thresh}$ OR $(\text{diff}_{N,N-2} > \text{pixChangeDiff}_{N,N-2}\text{smallThresh}$ AND $\text{diff}_{Sx,N-1} > \text{pixChangeDiff}_{Sx,Fm}\text{Thresh})$ wherein $\text{diff}_{a,b}$ is an absolute sum of differences of red, green and blue components between fields represented by a and b, field N being a current source field and fields N-1, N-2 and N-3 being successively preceding image fields, and the thresholds on the right hand side of each inequality being predetermined threshold values.

11. Image processing apparatus for image conversion by combining two or more source values in accordance with a mixing parameter to generate an output pixel value, the apparatus comprising:
  a calculator operable to calculate a first metric for a selected pixel at a selected pixel position in a current image field, the first metric being a difference between a directly preceding image field and a spatially interpolated version of the current image field at the selected pixel position;
  a categoriser operable to categorise, on the basis of the first metric, whether the selected pixel in the current image field provides either an indeterminate, unreliable or reliable basis for a determination of motion at the selected pixel position in the current image field, the selected pixel is categorised as indeterminate when, for all colour channels, the first metric is smaller than a standard deviation of pixel values in a test region surrounding the selected pixel in the current image field and a magnitude of a difference between the current image field and a previous corresponding image field at the selected pixel position is also smaller than the standard deviation of pixel values in the test region surrounding the selected pixel in the current image field; and
  an adjuster operable to adjust a mixing parameter associated with the selected pixel depending upon the categorisation made.

12. Image processing apparatus according to claim 11, in which the selected pixel is categorised as indeterminate if for a pixel position x, y and all colour channels c, $|F_{Sx}(x,y,c) - F_M(x,y,c)| < sd$ and $|F_N(x,y,c) - F_{N-1}(x,y,c)| < sd$ where sd is the standard deviation of the pixel values in the test region, calculated in previous image field $F_{N-1}$, $F_N(x,y,c)$ is the current image field, $F_{N-1}(x,y,c)$, is the directly preceding image field, $F_{Sx}(x,y,c)$ is a spatially interpolated version of the current image field $F_N$ or $F_{N-1}$ and $F_M(x,y,c)$ is an available input image field temporally adjacent to $F_{Sx}(x,y,c)$.

13. Image processing apparatus according for image conversion by combining two or more source values in accordance with a mixing parameter to generate an output pixel value, the apparatus comprising:
  a calculator operable to calculate a first metric for a selected pixel at a selected pixel position in a current image field, the first metric being a difference between a directly preceding image field and a spatially interpolated version of the current image field at the selected pixel position;
  a categoriser operable to categorise, on the basis of the first metric, whether the selected pixel in the current image field provides either an indeterminate, unreliable or reliable basis for a determination of motion at the selected pixel position in the current image field, the selected pixel is categorised as unreliable if for any colour channel the first metric is greater than a standard deviation of pixel values in a test region surrounding the selected pixel in the current image field plus a magnitude of a difference between the current image field and a previous corresponding image field at the selected pixel position, and is also greater than the standard deviation of pixel values in the test region surrounding the selected pixel plus a magnitude of a difference between the directly preceding image field and its previous corresponding image field at the selected pixel position; and an adjuster operable to adjust a mixing parameter associated with the selected pixel depending upon the categorisation made.

14. Image processing apparatus according to claim 13, in which the selected pixel is categorised as unreliable if for a pixel position x, y, and any colour channel c, $$|F_N(x,y,c)-F_{N-2}(x,y,c)|+sd<|F_{Sx}(x,y,c)-F_M(x,y,c)|$$

and $|F_{N-1}(x,y,c)-F_{N-3}(x,y,c)|+sd<|F_{Sx}(x,y,c)-F_M(x,y,c)|$ where sd is the standard deviation of the pixel values in the test region, calculated in field $F_{N-1}$, $F_N(x,y,c)$ is a current input field, $F_{N-1}(x,y,c)$, $F_{N-2}(x,y,c)$ and $F_{N-3}(x,y,c)$ are previous input fields, $F_{Sx}(x,y,c)$ is a spatially interpolated version of input field $F_N$ or $F_{N-1}$ and $F_M(x,y,c)$ is an available input image field temporally adjacent to $F_{Sx}(x,y,c)$.

15. Image processing apparatus according to claim 13, in which
if a selected pixel is categorised as unreliable, the mixing parameter associated with the selected pixel is derived from preceding image field data.

16. Image processing apparatus according to claim 15, wherein the adjuster
selects an array of regions centred over the selected pixel;
categorises each of the regions according to a number of reliable pixels respectively located therein that indicate motion; and
determines a mixing parameter value according to a pattern formed by the categorisation of the regions.

17. Image processing apparatus according to claim 16, in which a mixing parameter value is associated with each of a plurality of templates, and a lowest parameter value corresponding with a template that matches all or part of the pattern formed by the categorisation is selected.

18. Image processing apparatus for image conversion by combining two or more source values in accordance with a mixing parameter to generate an output pixel value, the apparatus comprising:
a calculator operable to calculate a first metric for a selected pixel at a selected pixel position in a current image field, the first metric being a difference between a directly preceding image field and a spatially interpolated version of the current image field at the selected pixel position;
a categoriser operable to categorise, on the basis of the first metric, whether the selected pixel in the current image field provides either an indeterminate, unreliable or reliable basis for a determination of motion at the selected pixel position in the current image field; and
an adjuster operable to adjust a mixing parameter associated with the selected pixel depending upon the categorisation made, wherein
the selected pixel is categorised as reliable if for all colour channels the first metric is not smaller than a standard deviation of pixel values in a test region surrounding the selected pixel in the current image field and a magnitude of a difference between the current image field and a previous corresponding image field at the selected pixel position is also not smaller than the standard deviation of pixel values in the test region surrounding the selected pixel in the current image field; and for any colour channels the first metric is not greater than the standard deviation of pixel values in the test region surrounding the selected pixel in the current image field plus the magnitude of the difference between the current image field and the previous corresponding image field at the selected pixel position, or is also not greater than the standard deviation of pixel values in the test region surrounding the selected pixel plus a magnitude of a difference between the directly preceding image field and its previous corresponding image field at the selected pixel position.

19. Image processing apparatus according to claim 18, in which the selected pixel is categorised as reliable if for a pixel position x, y and any colour channel c, $$|F_{Sx}(x,y,c)-F_M(x,y,c)|>=sd \text{ or}$$

$$|F_N(x,y,c)-F_{N-1}(x,y,c)|>=sd$$

and for a pixel position x, y, and all colour channels c, $$|F_N(x,y,c)-F_{N-2}(x,y,c)|+sd>=|F_{Sx}(x,y,c)-F_M(x,y,c)| \text{ or}$$

$$|F_{N-1}(x,y,c)-F_{N-2}(x,y,c)|+sd>|F_{Sx}(x,y,c)-F_M(x,y,c)|$$

where sd is the standard deviation of the pixel values in the test region, calculated in field $F_{N-1}$, $F_N(x,y,c)$ is a current input field, $F_{N-1}(x,y,c)$, $F_{N-2}(x,y,c)$ and $F_{N-3}(x,y,c)$ are previous input fields, $F_{Sx}(x,y,c)$ is a spatially interpolated version of input field $F_N$ or $F_{N-1}$ and $F_M(x,y,c)$ is an available input image field temporally adjacent to $F_{Sx}(x,y,c)$.

20. Image processing apparatus according to claim 18, in which the selected pixel is categorised as reliable if $$\text{diff}_{N,N-2}>\text{pixChangeDiff}_{N,N-2}\text{bigThresh OR}$$

$$\text{diff}_{N-1,N-3}>\text{pixChangeDiff}_{N,N-3}\text{Thresh OR}$$

$$(\text{diff}_{N,N-2}>\text{pixChangeDiff}_{N,N-2}\text{smallThresh AND}$$
$$\text{diff}_{Sx,N-1}>\text{pixChangeDiff}_{SxFm}\text{Thresh})$$

wherein $\text{diff}_{a,b}$ is an absolute sum of differences of red, green and blue components between fields represented by a and b, field N being a current source field and fields N-1, N-2 and N-3 being successively preceding image fields, and the thresholds on the right hand side of each inequality being predetermined threshold values.

21. A non-transitory computer-readable storage medium comprising computer readable instructions that, when executed by a computer, cause the computer to carry out a method of image processing for image conversion by combining two or more source values in accordance with a mixing parameter to generate an output pixel value, the method comprising the steps of:
calculating a first metric for a selected pixel at a selected pixel position in a current image field, the first metric being a difference between a directly preceding image field and a spatially interpolated version of the current image field at the selected pixel position;
categorising, on the basis of the first metric, whether the selected pixel in the current image field provides either an indeterminate, unreliable or reliable basis for a determination of motion at the selected pixel position in the current image field, the selected pixel is categorised as indeterminate when, for all colour channels, the first metric is smaller than a standard deviation of pixel values in a test region surrounding the selected pixel in the current image field and a magnitude of a difference between the current image field and a previous corresponding image field at the selected pixel position is also smaller than the standard deviation of pixel values in the test region surrounding the selected pixel in the current image field; and adjusting the mixing parameter associated with the selected pixel depending upon the categorisation made.

\* \* \* \* \*